US009180695B2

(12) United States Patent
Kerxhalli et al.

(10) Patent No.: US 9,180,695 B2
(45) Date of Patent: Nov. 10, 2015

(54) SYSTEM AND METHOD FOR DYNAMIC MEASUREMENT OF DIMENSION CHANGE FOR A SHEET

(71) Applicant: Xerox Corporation, Norwalk, CT (US)

(72) Inventors: David Mark Kerxhalli, Rochester, NY (US); Jonathan B. Hunter, Marion, NY (US); David R. Kretschmann, Webster, NY (US); Ronald W. Bogert, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 315 days.

(21) Appl. No.: 13/868,498

(22) Filed: Apr. 23, 2013

(65) Prior Publication Data

US 2014/0311367 A1 Oct. 23, 2014

(51) Int. Cl.

*G06K 15/00* (2006.01)
*B41J 11/46* (2006.01)
*B41J 3/60* (2006.01)

(52) U.S. Cl.

CPC ... *B41J 11/46* (2013.01); *B41J 3/60* (2013.01)

(58) Field of Classification Search

None

See application file for complete search history.

(56) References Cited

U.S. PATENT DOCUMENTS

| | | | | |
|---|---|---|---|---|
| 5,597,154 A * | 1/1997 | Yamashita | 271/10.05 |
| 8,494,384 B2 * | 7/2013 | Furuya et al. | 399/44 |
| 8,838,010 B2 * | 9/2014 | Nakura et al. | 399/389 |
| 8,910,939 B2 * | 12/2014 | Nakura et al. | 271/272 |
| 8,931,874 B1 * | 1/2015 | Piatt et al. | 347/16 |
| 2011/0084438 A1 | 4/2011 | Tooker et al. | |
| 2013/0078016 A1 * | 3/2013 | Koyama et al. | 399/328 |

* cited by examiner

*Primary Examiner* — Steven Kau

(74) *Attorney, Agent, or Firm* — Simpson & Simpson, PLLC

(57) ABSTRACT

A method including: displacing a plurality of sheets through a defined portion of a process path; generating, using an encoder, a first number of encoder pulses associated with displacing a first sheet from the plurality of sheets along the defined portion; applying first indicia to a first side of the first sheet; displacing the first sheet through the defined portion; generating, using the encoder, a second number of encoder pulses associated with displacing the first sheet along the defined portion; calculating, using a processor, a ratio including the first and second numbers; applying second indicia to the respective second side of the first sheet or third indicia to the respective first side of a second sheet from the plurality of sheets, or fourth indicia to the respective second side of the second sheet; and adjusting, using the processor, application of the second, third, or fourth indicia according to the ratio.

22 Claims, 5 Drawing Sheets

SYSTEM AND METHOD FOR DYNAMIC MEASUREMENT OF DIMENSION CHANGE FOR A SHEET

TECHNICAL FIELD

The present disclosure relates to a system and method for measuring a change in dimension for a sheet of paper due to operations applying indicia to the paper. In particular, the system and method use a ratio of encoder pulses related to respective movement of oppositely facing sides of the sheet of paper in a process path to determine a dimension change, due to operations on one side of the paper, to adjust application of indicia on the other side of the paper.

BACKGROUND

When applying indicia to both sides of a sheet of paper, it is desirable to maintain a specified registration between indicia on a front side of the sheet and indicia of the back side of the sheet. The registration noted above assumes a particular dimensionality of the sheet. Known systems and methods for applying indicia, such as xerography, dry ink printing, aqueous ink printing, and lithography, to two sides of a sheet of paper involve operations on the first/top side of the sheet, such as applying heat and pressure, or adding liquid, which can change the dimensions, for example length, of the sheet, for example by changing the moisture content of the sheet or stretching the sheet. When the application of indicia to the top sheet changes the dimensions of the sheet, the assumed dimensionality is no longer accurate and subsequently, the indicia applied to the back side can be out of registration with indicia on the front side.

For example, a xerographic machine passes a sheet through a fuser to fix indicia on a front side of a sheet. The fuser applies heat and pressure which can drive moisture out of the sheet, shrinking the sheet and changing the length of the sheet. Thus, the image magnification for the front side is not appropriate for image magnification for a back side of the sheet, and mis-registration occurs between print on the front and back sides of the sheet. It is known to use a manual measurement procedure to measure mis-registration on a sheet of paper. However, the procedure requires an operator to manually measure a test pattern on both sides of a printed sheet, which is time consuming and prone to operator error.

Many factors contribute to the dimensional change, for example an amount of paper shrinkage through the fuser of a xerographic machine. These factors include: paper type, environmental conditions, and machine settings/conditions. In addition to the time and error problems noted above, the manual measurement described above is only a snapshot in time and needs to be performed again whenever there is a change in any of these factors.

SUMMARY

According to aspects illustrated herein, there is provided an apparatus for compensating application of indicia to a sheet of paper according to a change in dimension for the sheet, including: a processor; a measuring system including a plurality of rollers and an encoder connected to a first roller from the plurality of rollers and configured to generate a pulse for each rotation of the first roller by a specified angle; and an indicia system. The apparatus is arranged to perform the following sequence: displace, using the plurality of rollers, a first plurality of sheets along a defined portion of a process path for the apparatus, each sheet having respective first and second sides; generate, using the encoder, a first number of pulses associated with displacement of a first sheet, from the first plurality of sheets, along the defined portion; apply, using the indicia system, first indicia to the respective first side of the first sheet; displace, using the plurality of rollers, the first sheet along the defined portion of the process path; generate, using the encoder, a second number of pulses associated with displacement of the first sheet along the defined portion; calculate, using the processor, a ratio including the first and second numbers and apply, using the indicia system: second indicia to the respective second side of the first sheet; or third indicia to the respective first side of a second sheet from the first plurality of sheets; or fourth indicia to the respective second side of the second sheet. The apparatus is arranged to adjust, using the processor, application of the second, third, or fourth indicia according to the ratio.

According to aspects illustrated herein, there is provided a computer-based method for compensating application of indicia to a sheet according to a change in dimension for the sheet, including: displacing each sheet in a first plurality of sheets through a defined portion of a process path of an apparatus; generating, using an encoder for the apparatus, a first number of encoder pulses associated with displacing a first sheet from the plurality of sheets along the defined portion of the process path; applying first indicia to a first side of the first sheet; displacing the first sheet through the defined portion of the process path of the apparatus; generating, using the encoder, a second number of encoder pulses associated with displacing the first sheet along the defined portion of the process path; calculating, using a processor for the apparatus, a ratio including the first and second numbers; applying second indicia to the respective second side of the sheet or third indicia to the respective first side of a second sheet from the plurality of sheets or fourth indicia to the respective second side of the second sheet; and adjusting, using the processor, application of the second, third, or fourth indicia according to the ratio.

According to aspects illustrated herein, there is provided a printer for compensating application of indicia to a sheet according to a change in dimension for the sheet of paper, including: a processor; a plurality of pairs of rollers, each pair of rollers including a respective first roller and a respective second roller arranged to engage each sheet from a plurality of sheets and displace said each sheet along a process path for the printer in a process direction; first and second edge sensors in the process path and separated from each other by a distance in the process direction; an encoder connected to the respective first rollers in the plurality of pairs of rollers and arranged to generate a pulse for each rotation of the respective first rollers by a specified angle; and an indicia system. Said each sheet includes respective first and second sides and respective first and second edges. The plurality of pairs of rollers is arranged to displace, at a first point in time, a first sheet from the plurality of sheets along the process path in the process direction. The first and second edge sensors are configured to detect the respective first and second edges of the first sheet at first and second times, respectively. The encoder is arranged to generate a first number of pulses for a first duration between the first and second times. The indicia system is arranged to print on the respective first side of the first sheet. The plurality of pairs of rollers is arranged to displace, at a second point in time, the first sheet along the process path in the process direction. The first and second edge sensors are configured to detect the first and second edges of the first sheet at third and fourth times, respectively. The encoder is arranged to generate a second number of pulses for a second duration between the third and fourth times. The processor is configured to calculate a ratio including the first and second number of pulses. The indicia system is arranged to print on the respective second side of the first sheet or the respective first side of a second sheet from the plurality of sheets or the respective second side of the second sheet. The processor is configured to adjust a position of print on the respective second side of the first sheet, the respective first side of the second sheet, or the respective second side of the second sheet according to the ratio.

BRIEF DESCRIPTION OF THE DRAWINGS

Various embodiments are disclosed, by way of example only, with reference to the accompanying schematic drawing in which corresponding reference symbols indicate corresponding parts, in which.

DETAILED DESCRIPTION

Moreover, although any methods, devices or materials similar or equivalent to those described herein can be used in the practice or testing of these embodiments, some embodiments of methods, devices, and materials are now described.

It should be understood that the use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B.

Figure 1A:
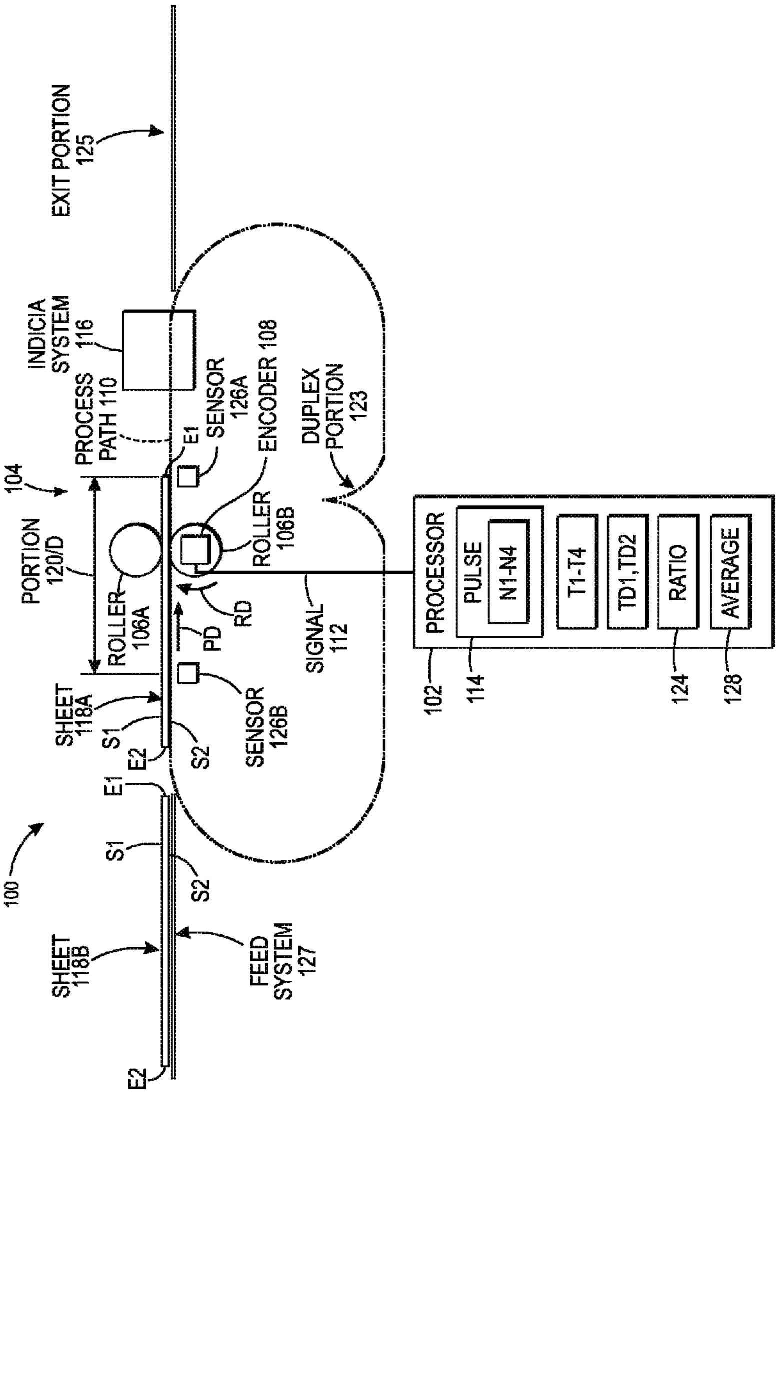
FIG. 1A is a schematic block diagram of an apparatus with compensation of application of indicia to a sheet according to a change in dimension for the sheet of paper.

FIG. 1A is a schematic block diagram of apparatus 100 for compensating application of indicia to a sheet according to a change in dimension for the sheet.

Figure 1B:
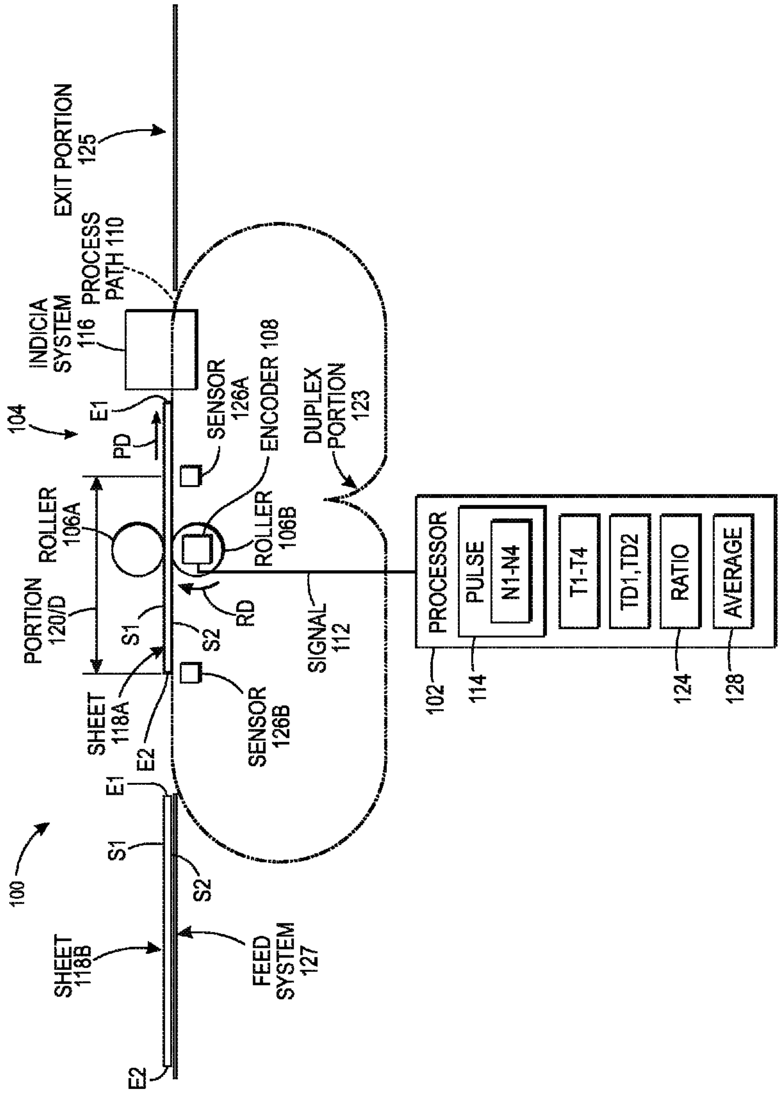
FIG. 1B is a schematic block diagram of an apparatus with compensation of application of indicia to a sheet according to a change in dimension for the sheet of paper.

FIG. 1B is a schematic block diagram of apparatus 100 for compensating application of indicia to a sheet according to a change in dimension for the sheet of paper.

Figure 2:
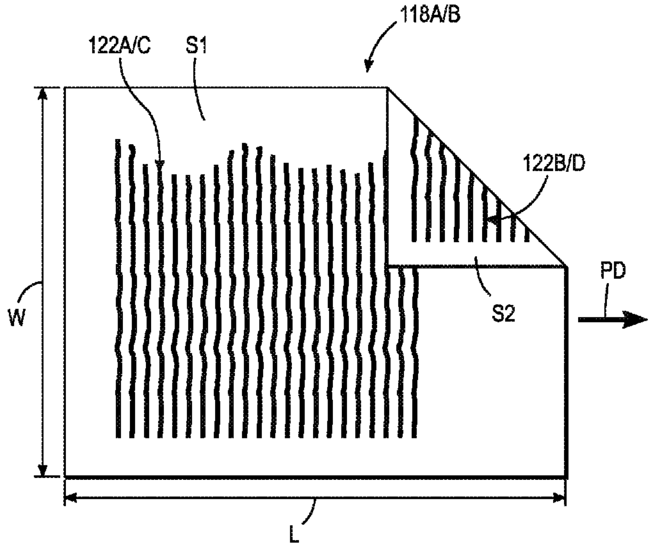
FIG. 2 is a schematic representation of a sheet with indicia on both sides.

FIG. 2 is a schematic representation of a sheet with indicia on both sides. The following should be viewed in light of FIGS. 1A through 2. Apparatus 100 includes: processor 102 and measurement system 104, including plurality of rollers 106 and encoder 108, in process path 110 for the apparatus. The encoder is connected to at least one roller from the plurality of rollers and is configured to generate signal 112 including pulse 114 for each rotation of the roller, for example in direction RD, by a specified angle, as is known in the art. Apparatus 100 includes indicia system 116. Apparatus 100 is arranged to displace a plurality of sheets 118, for example sheets 118A and 118B, along defined portion 120 of the process path. Each sheet 118 includes sides S1 and S2 and edges E1 and E2. Apparatus 100 is arranged to perform the following sequence: displace one sheet from the plurality of sheets 118, for example, sheet 118A, along defined portion 120 of the process path; generate, using the encoder, N1 number of pulses 114 associated with displacement of sheet 118A along portion 120; and apply, using the indicia system, indicia 122A to side S1 of sheet 118A. Apparatus 100 is arranged to then: flip sheet 118A in duplex portion 123; displace sheet 118A along portion 120; generate, using the encoder, N2 number of pulses 114 associated with displacement of sheet 118A along portion 120; calculate, using the processor, ratio 124 including N1 and N2; apply, using system 116, indicia 122B to side S2 of sheet 118A; and move sheet 118A from path 110 to exit portion 125.

Apparatus 100 is arranged to perform the following sequence: move another sheet from the plurality of sheets 118, for example sheet 118B, from feed system 127 to path 110; displace sheet 118B along defined portion 120; apply, using the indicia system, indicia 122C to side S1 of sheet 118B; flip sheet 118B in duplex portion 123; displace sheet 118B along portion 120; apply, using system 116, indicia 122D to side S2 of sheet 118B. Apparatus 100 is arranged to adjust, using processor 102, application of indicia 122B, 122C, or 122D according to ratio 124. It should be understood that sheet 118B can be immediately after sheet 118A in a sequence or can be separated from sheet 118A by one or more other sheets in the sequence.

In an example embodiment, measurement system 104 includes edge sensors 126A and 126B separated from each other in process direction PD by distance D, which defines portion 120. PD is the direction in which each sheet 118 is displaced along the process path. That is, portion 120 is the portion of the process path between sensors 126A and 126B. In an example embodiment, system 104 includes at least one pair of rollers 106A/B. One of rollers 106A/B is arranged to apply pressure to grip each sheet 118 between rollers 106A/B and rotate to displace each sheet 118 along path 110 in direction PD. The other of rollers 106A/B is connected to the encoder. For example in FIG. 1, roller 106A applies the pressure and rotation and roller 106B is the roller connected to the encoder as noted above. In an example embodiment, length L of each sheet 118 is greater than distance D, such that each sheet 118 is gripped by rollers 106A/B as each end E1 is detected by sensor 126A and as each end E2 is detected by sensor 126B.

In an example embodiment, to generate N1: sensor 126A is configured to: detect leading edge E1 of sheet 118A, moving in the process direction, at time T1; sensor 126B is configured to detect trailing edge E2 of sheet 118A at time T2, following T1; and sheet 118A is arranged to rotate roller 106B such that encoder 108 generates N1 pulses between T1 and T2. In an example embodiment, to generate N2: sensor 126A is configured to: detect leading edge E2 of sheet 118A, moving in the process direction, at time T3; sensor 126B is configured to detect trailing edge E2 at time T4, following T3; and sheet 118A is arranged to rotate roller 106B such that encoder 108 generates N2 pulses between T3 and T4.

In an example embodiment, ratio 124 is calculated as N1/N2 or N2/N1. In an example embodiment, to make the ratio calculation more robust, a nominal number of pulses N3 from the encoder for distance D are determined by any means known in the art. Then, the ratio is calculated as: [N1+N3]/[N2+N3] or [N2+N3]/[N1+N3]. In an example embodiment, respective positions of indicia 122B, 122C, or 122D are adjusted along respective length L of sheet 118A or sheet 118B.

Apparatus 100, in particular, system 116, can use any process known in the art for applying indicia to a sheet. Such processes can include, but are not limited to: applying heat to the sheet, applying pressure to the sheet, removing moisture from the sheet, adding moisture to the sheet, and stretching the sheet. Such processes can include, but are not limited to xerography, dry ink printing, aqueous ink printing, and lithography. In an example embodiment, application of indicia 122A 122B, 122C, and 122D includes magnifying indicia 122A, 122B, 122C, and 122D, and adjusting application of indicia 122B, 122C, or 122D according to ratio 124 includes adjusting magnification of indicia 122B, 122C, or 122D according to the ratio. Any magnification known in the art can be used with apparatus 100. For example, magnification can be performed by use of hardware, such as lenses; or, magnification can be performed by operating on digital data, for example, digital data obtained from use of a light emitting diode bar.

Respective ratios 124 can be calculated for each sheet in a plurality of sheets. In an example embodiment, the processor is configured to calculate running average 128 of the respective ratios 124. That is, as ratio 124 is calculated for a particular sheet, the ratio is averaged with the ratios for the previous sheets in the plurality of sheets. Average 128 can be determined for a particular type of sheet material, a particular process, a particular machine or type of machine, or for sheets coming from particular manufacturing or storage situations. Then, when the same type of sheet is used, the respective average 128 can be used as a default setting for adjusting application of indicia.

Figure 3:
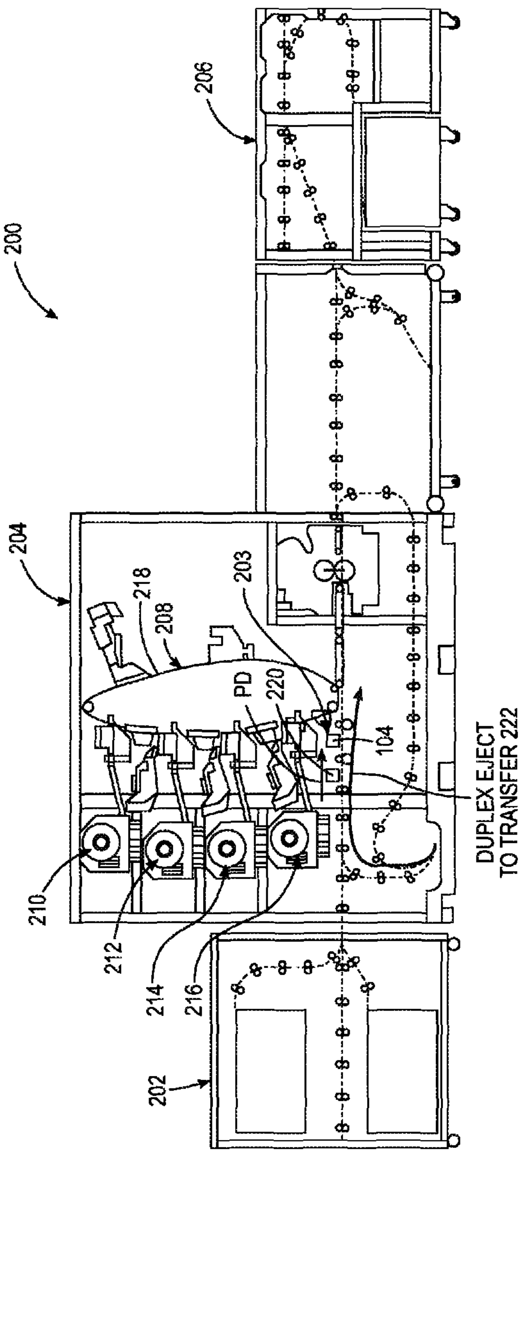
FIG. 3 is a schematic representation of a printer with compensation of application of indicia to a sheet according to a change in dimension for the sheet of paper; and, FIG. 4 is a flow chart illustrating a method of compensating application of indicia to a sheet according to a change in dimension for the sheet.

FIG. 3 is a schematic top view of a portion of printer 200 for compensating application of indicia to a sheet according to a change in dimension for the sheet. The following should be viewed in light of FIGS. 1A through 3. In an example embodiment, apparatus 100 is printer 200. The discussion for FIGS. 1A and 1B regarding apparatus 100 is applicable to printer 200 except as noted. Processor 102 is not shown in FIG. 3 and can be located anywhere within and without printer 200 as is known in the art. In an example embodiment, printer 200 includes feeder module 202 that feeds sheets (e.g., paper or other print media) into process path 203, for example, into marker module 204, which outputs printed sheets to stacker module 206. Marker module 204 includes photoreceptor 208 and a plurality of rollers that apply toner to the sheets as the sheets pass by each respective roller. According to an example, marker module 204 includes a plurality of color rollers 210, 212, 214, and 216. It will be appreciated that the described systems and methods are not limited to any marking techniques, and may use any suitable monochrome or color marking technique. In general, module 204 includes indicia system 116 described above.

As key roller 216 begins to lay down indicia on leading edge E1 of a given sheet 118 (e.g., as the leading edge passes the key roller) with side S1 up, a digital signal is generated and includes a timestamp or other information indicating a time of arrival of the leading edge of the sheet. Since the speed at which the image is traveling on photoreceptor belt 218 is known, and since the distance between imaging stations (e.g., registration points) is known, the system knows when to begin writing with each respective imaging station. Additionally, marker module 204 comprises registration entrance sensor 220 that senses sheet position for adjusting a duplex "eject-to-transfer" time. In an example embodiment, sensor 220 is included in system 104, for example, as sensor 126A or 126B. In an example embodiment, system 104 is proximate sensor 220. A sheet 118 is flipped on duplex path 222, for example, such that side S2 is up.

The following provides further detail regarding apparatus 100. In an example embodiment, apparatus 100 is a xerographic machine and pressure and heat are applied to the sheet as part of xerographic operations on side S1. The pressure and heat can drive moisture from sheet 118A, shrinking the sheet, in particular along length L of the sheet. By using ratio 124, indicia 122B, 122C, or 122D can be adjusted to ensure registration between respective indicia on respective sides S1 and S2. That is, ratio 124 provides automatic adjustment of the registration to accommodate a change in the dimensions of a sheet 118, in particular, a decrease in length L.

In an example embodiment, apparatus 100 is an aqueous ink or lithographic machine and the application of indicia 122A 122B, 122C, and 122D involves adding liquid, for example ink, to each sheet 118 as part of the printing or lithographic process. The addition of a liquid, plus possible stretching of each sheet 118, as part of the process of transporting the sheet and applying the liquid, can result in an increase in L. In this case, by using ratio 124, registration of respective indicia on respective sides S1 and S2 for each sheet 118 is ensured. That is, ratio 124 provides automatic adjustment of the registration to accommodate a change in the dimensions of a sheet 118, in particular, an increase in length L. In general, change in dimension to a sheet due to any chemical processing of the sheet can be accounted for by apparatus 100.

In an example embodiment, operations performed by apparatus 100 include stretching sheet 118, as a result of the architecture for processing upon the sheet. As noted above, the use of ratio 124 enables adjust to account for such stretching and maintain a desired registration between respective indicia on respective sides S1 and S2 for each sheet 118

In an example embodiment, change to width W of a sheet 118 can be determined. For example, a ratio of a change in W with respect to a change in L can be calculated or otherwise obtained and this ratio can be used to determine the change in W when the change in L is known.

Advantageously, apparatus 100 enables real time, dynamic, and constant registration adjustment. For example, dimensional change is measured for a single sheet in real time and registration adjustment is made for that sheet or a subsequent sheet in real time. Thus, there is no lag in the measuring of dimensional change and appropriate adjustment to that change. Further, the real time measurements enable appropriate adjustment responsive to actual conditions and materials.

Apparatus 100 provides the following advantages as well. Apparatus 100 enables accurate correction for side 1 (S1) to side 2 (S2) magnification differences under all conditions, including changing environmental conditions, such as humidity levels and temperature, which affect paper dimensions. Apparatus 100 enables accurate correction for changing sheet media types, such as cover stock and lightweight stock, which change dimensions to differing degrees in the face of varying environmental, such as humidity or temperature, and machine conditions, for instance, fuser setpoints. Apparatus 100 saves operator and service technician time by reducing the time and frequency necessary to perform image to paper registration setup. Apparatus 100 enables registration adjustment for all size sheets supported by a particular embodiment of apparatus 100.

Apparatus 100 enables simple and cost-effective implementation. In some instances, the components of system 104 are already in place and only relatively simple programming adjustments are required. Apparatus 100 reduces front to back show-through error. Apparatus 100 does not depend on accurately measuring an absolute length of the page (an inherent problem with other approaches). Rather, apparatus 100 measures a difference between S1 to S2 and calculates ratio 124. Any error in the S1 measurement is normalized with the same error in the S2 measurement. Apparatus 100 enables, for example through the use of a run-time average, accurate default adjustment.

Figure 4:
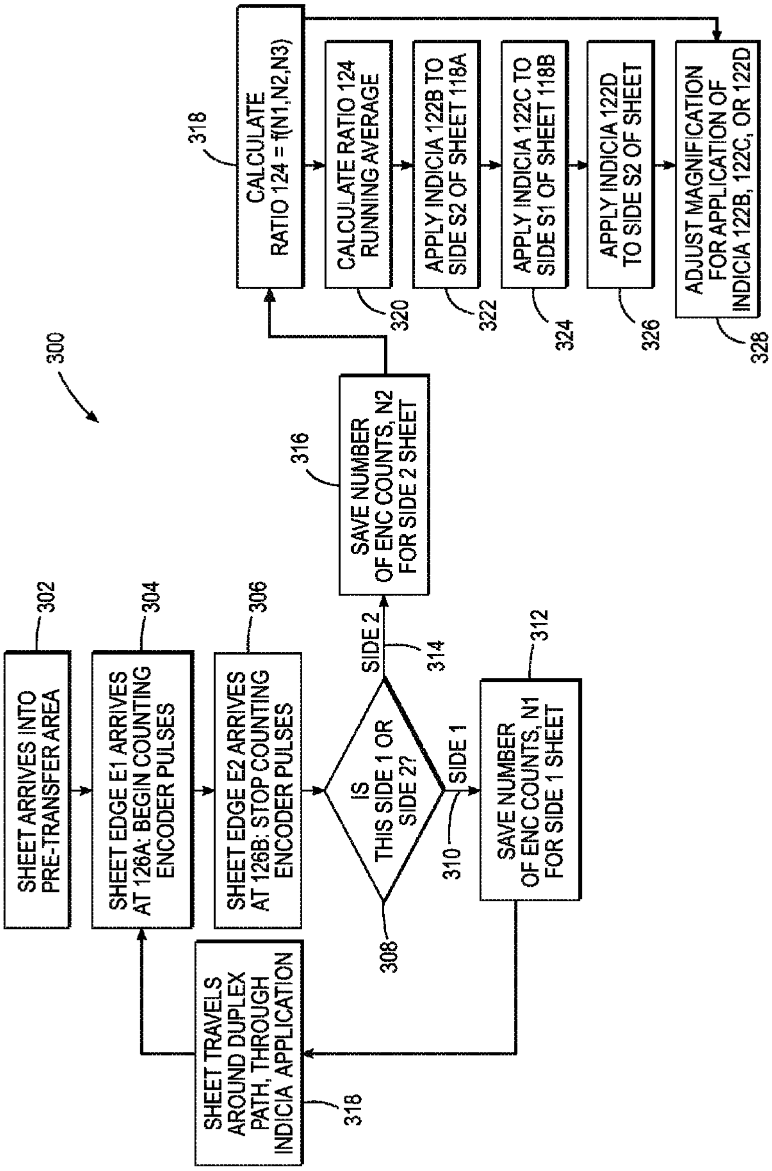

FIG. 4 is flow chart 300 illustrating a method for compensating application of indicia to a sheet according to a change in dimension for the sheet of paper. The following should be viewed in light of FIGS. 1A through 4. Step 302 begins the process. At step 304, leading edge E1 of sheet 118A is detected by sensor 126A and counting of encoder pulses begins. At step 306, trailing edge E2 of sheet 118A is detected by sensor 126B and counting of encoder pulses stops. At step 308 a determination is made as to whether S1 or S2 is being processed. For S1, (indicia 122A not yet applied), branch 310 is made to step 312, which saves the encoder counts as N1. For S2, (indicia 122A applied, indicia 122B not yet applied), branch 314 is made to step 316, which saves the encoder counts as N2. Step 318 calculates ratio 124. Optional step 320 calculates running average 128 of ratio 124. Step 322 applies indicia 122B to side S2 of sheet 118A. Step 324 applies indicia 122C to side S1 of sheet 118B. Step 326 applies indicia 122D to side S2 of sheet 118B. Step 328 adjusts magnification for application of indicia 122B, 122C, or 122D.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for compensating application of indicia to a sheet according to a change in dimension for the sheet, comprising:
- a processor;
- a measuring system including:
  - a plurality of rollers; and,
  - an encoder connected to a first roller from the plurality of rollers and configured to generate a pulse for each rotation of the first roller by a specified angle; and,
- an indicia system, wherein the apparatus is arranged to perform the following sequence:
  - displace, using the plurality of rollers, a first plurality of sheets along a defined portion of a process path for the apparatus, each sheet having respective first and second sides;
  - generate, using the encoder for a first duration, a first number of pulses associated with displacement of a first sheet, from the first plurality of sheets, along the defined portion;
  - apply, using the indicia system, first indicia to the respective first side of the first sheet;
  - displace, using the plurality of rollers, the first sheet along the defined portion of the process path;
  - generate, using the encoder for a second duration following the first duration, a second number of pulses associated with displacement of the first sheet along the defined portion;
  - calculate, using the processor, a first ratio including the first and second numbers;
  - apply, using the indicia system:
    - second indicia to the respective second side of the first sheet; or,
    - third indicia to the respective first side of a second sheet from the first plurality of sheets; or,
    - fourth indicia to the respective second side of a second sheet from the first plurality of sheets; and,
  - adjust, using the processor, application of the second, third, or fourth indicia according to the ratio.

2. The apparatus of claim 1, further comprising:
- first and second edge sensors in the process path located at first and second ends of the defined portion, respectively, wherein:
- the first roller is rotatable by displacement of said each sheet in the process direction;
- generating the first number of encoder pulses includes:
  - detecting, using the first and second edge sensors:
    - a first edge of the first sheet, moving in the process direction, at a first time;
    - a second edge of the first sheet, opposite the first edge in the process direction, at a second time, following the first time;
  - rotating, with the first sheet, the first roller; and,
  - generating, with the encoder, the first number of pulses between the first and second times; and,
- generating the second number of encoder pulses includes:
  - detecting, using the first and second edge sensors:
    - the first edge of the first sheet, moving in the process direction, at a third time;
    - the second edge of the first sheet at a fourth time, following the third time;
  - rotating, with the sheet of paper, the first roller; and,
  - generating, with the encoder, the second number of pulses between the third and fourth times.

3. The apparatus of claim 2, wherein:
- a third number of pulses, from the encoder, for the distance between the first and second sensors is known; and,
- the processor is configured to calculate the ratio by:
  - calculating a first sum of the first and third number of pulses;
  - calculating a second sum of the second and third number of pulses; and,
  - dividing the first sum by the second sum; or,
  - calculating a first sum of the second and third number of pulses;
  - calculating a second sum of the first and third number of pulses; and,
  - dividing the first sum by the second sum.

4. The apparatus of claim 2, wherein:
- adjusting the application of the second, third, and fourth indicia according to the ratio includes adjusting, along a respective length of the first or second sheet, respective positions of the second, third, or fourth indicia according to the ratio.

5. The apparatus of claim 2, wherein:
- applying the second indicia to the respective second side includes performing at least one operation from the group consisting of applying heat to the sheet of paper, applying pressure to the sheet of paper, removing moisture from the sheet of paper, adding moisture to the sheet, and stretching the sheet of paper.

6. The apparatus of claim 2, wherein:
- applying the second indicia to the respective second side includes performing an operation selected from the group consisting of xerography, dry ink printing, aqueous ink printing, and lithography.

7. The apparatus of claim 2, wherein:
- applying the first, second, third, or fourth indicia includes magnifying the second, third, or fourth indicia; and,
- adjusting the application of the second, third, or fourth indicia according to the ratio includes adjusting magnification for the second, third, or fourth indicia according to the ratio.

8. The apparatus of claim 1, wherein:

the first and second edge sensors are separated by a distance in the process direction; and, said each sheet has a respective length, from the respective first edge to the respective second edge, greater than the distance.

9. The apparatus of claim 1, wherein:

the apparatus is arranged to displace the first plurality of sheets in sequence along the defined portion of the process path;

the apparatus is arranged to perform the following sequence for each sheet in the first plurality of sheets following the first sheet:

generate, using the encoder for a respective third duration, a respective third number of encoder pulses associated with displacing said each third sheet in the first plurality of sheets following the first sheet along the defined portion of the process path;

apply, using the indicia system, respective fifth indicia to the respective first side of said each third sheet;

displace, using the plurality of rollers, said each third sheet through the defined portion of the process path;

generate, using the encoder for a respective fourth duration, a respective fourth number of encoder pulses associated with displacing said each third sheet along the defined portion of the process path;

calculate, using the processor, a respective second ratio including the respective third and fourth numbers;

apply, using the indicia system, respective sixth indicia to the respective second side of said each third sheet;

adjust, using the processor:

a first position of the respective sixth indicia, for said each third sheet in the first plurality of sheets, according to the respective second ratio; or, a second position of the respective fifth indicia for a respective fourth sheet following said each third sheet in sequence; or, a third position of the respective sixth indicia for a respective fourth sheet following said each third sheet; and, calculate, using the processor, a running average of the respective second ratios; and, the processor is configured to adjust application of seventh indicia to a second plurality of sheets of paper according to the running average.

10. A method for compensating application of indicia to a sheet according to a change in dimension for the sheet, comprising:

displacing each sheet in a first plurality of sheets through a defined portion of a process path of an apparatus;

generating, using an encoder for the apparatus for a first duration, a first number of encoder pulses associated with displacing a first sheet from the plurality of sheets along the defined portion of the process path;

applying first indicia to a first side of the first sheet;

displacing the first sheet through the defined portion of the process path of the apparatus;

generating, using the encoder for a second duration following the first duration, a second number of encoder pulses associated with displacing the first sheet along the defined portion of the process path;

calculating, using a processor for the apparatus, a first ratio including the first and second numbers;

applying:

second indicia to the respective second side of the first sheet; or, third indicia to the respective first side of a second sheet from the plurality of sheets; or, fourth indicia to the respective second side of a second sheet from the first plurality of sheets; and, adjusting, using the processor, application of the second, third, or fourth indicia according to the ratio.

11. The method of claim 10, wherein:

displacing said each sheet through the defined portion of the process path includes rotating a roller connected to an encoder;

generating a pulse, using the encoder, for each rotation of the roller by a specified angle;

generating the first number of encoder pulses includes;

detecting, using first and second edge sensors disposed along the process path at first and second ends of the defined portion:

a first edge of the first sheet, moving in the process direction, at a first time;

a second edge of the first sheet, opposite the first edge in the process direction, at a second time, following the first time;

rotating, with the first sheet, the roller; and, generating, with the encoder, the first number of pulses between the first and second times; and, generating the second number of encoder pulses includes:

detecting, using the first and second edge sensors:

the first edge of the first sheet, moving in the process direction, at a third time;

the second edge of the first sheet at a fourth time, following the third time;

rotating, with the first sheet, the roller; and, generating, with the encoder, the second number of pulses between the third and fourth times.

12. The method of claim 11, wherein:

a third number of pulses from the encoder for the distance between the first and second sensors is known; and, calculating the ratio includes:

calculating a first sum of the first and third number of pulses;

calculating a second sum of the second and third number of pulses; and, dividing the first sum by the second sum; or, calculating a first sum of the second and third number of pulses;

calculating a second sum of the first and third number of pulses; and, dividing the first sum by the second sum.

13. The method of claim 11, wherein:

the first and second edge sensors are separated by a distance in the process direction; and, said each sheet has a respective length, from the respective first edge to the respective second edge, greater than the distance.

14. The method of claim 10, wherein:

adjusting the application of the second, third, and fourth indicia according to the ratio includes adjusting, along a respective length of the first or second sheet, respective positions of the second, third, or fourth indicia according to the ratio.

15. The method of claim 10, wherein:

applying the second indicia to the second side includes performing at least one operation from the group consisting of applying heat to the sheet of paper, applying pressure to the sheet of paper, removing moisture from the sheet of paper, adding moisture to the sheet, and stretching the sheet of paper.

16. The method of claim 10, wherein:

applying the second indicia to the second side includes performing an operation selected from the group consisting of xerography, dry ink printing, aqueous ink printing, and lithography.

17. The method of claim 10, wherein:

applying the first, second, third, or fourth indicia includes magnifying the second, third, or fourth indicia; and, adjusting the application of the second, third, or fourth indicia according to the ratio includes adjusting magnification for the second, third, or fourth indicia according to the ratio.

18. The method of claim 10, further comprising:

displacing the first plurality of sheets in sequence along the defined portion of the process path; and, for each third sheet in the first plurality of sheet following the first sheet in the first plurality of sheets:

generating, using the encoder for a respective third duration, a respective third number of encoder pulses associated with displacing said each third sheet along the defined portion of the process path;

applying respective fifth indicia to the respective first side of said each third sheet;

displacing said each third sheet through the defined portion of the process path;

generating, using the encoder for a respective fourth duration following the respective third duration, a respective fourth number of encoder pulses associated with displacing said each third sheet along the defined portion of the process path;

calculating, using the processor, a respective second ratio including the respective third and fourth numbers;

applying respective sixth indicia to the respective second side of said each third sheet;

adjusting, using the processor:

a first position of the respective sixth indicia, for said each third sheet in the first plurality of sheets, according to the respective second ratio; or, a second position of the respective fifth indicia for a respective fourth sheet following said each third sheet in sequence; or, a third position of the respective sixth indicia for a respective fourth sheet following said each third sheet; and, calculating, using the processor, a running average of the respective second ratios; and, adjusting, using the processor, application of seventh indicia to a second plurality of sheets of paper according to the running average.

19. A printer for compensating application of indicia to a sheet according to a change in dimension for the sheet, comprising:

a processor;

a plurality of pairs of rollers, each pair of rollers including a respective first roller and a respective second roller arranged to engage each sheet from a plurality of sheets and displace said each sheet along a process path for the printer in a process direction;

first and second edge sensors in the process path and separated from each other by a distance in the process direction;

an encoder:

connected to the respective first rollers in the plurality of pairs of rollers; and, arranged to generate a pulse for each rotation of the respective first rollers by a specified angle; and, an indicia system, wherein:

said each sheet includes respective first and second sides and respective first and second edges;

the plurality of pairs of rollers is arranged to displace, at a first point in time, a first sheet from the plurality of sheets along the process path in the process direction;

the first and second edge sensors are configured to detect the respective first and second edges of the first sheet at first and second times, respectively;

the encoder is arranged to generate a first number of pulses for a first duration between the first and second times;

the indicia system is arranged to print on the respective first side of the first sheet;

the plurality of pairs of rollers is arranged to displace, at a second point in time, the first sheet along the process path in the process direction;

the first and second edge sensors are configured to detect the first and second edges of the first sheet at third and fourth times, respectively;

the encoder is arranged to generate a second number of pulses for a second duration between the third and fourth times;

the processor is configured to calculate a ratio including the first and second number of pulses;

the indicia system is arranged to print on:

the respective second side of the first sheet; or, the respective first side of a second sheet from the plurality of sheets; or, the respective second side of the second sheet; and, the processor is configured to adjust a position of print on the respective second side of the first sheet, the respective first side of the second sheet, or the respective second side of the second sheet according to the ratio.

20. The printer of claim 19, wherein:

a third number of pulses from the encoder for the distance between the first and second sensors is known; and, the processor is configured to calculate the ratio by:

calculating a first sum of the first and third number of pulses;

calculating a second sum of the second and third number of pulses; and, dividing the first sum by the second sum; or, calculating a first sum of the second and third number of pulses;

calculating a second sum of the first and third number of pulses; and, dividing the first sum by the second sum.

21. The apparatus of claim 19, wherein:

printing on the respective second side of the first sheet, the respective first side of the second sheet, or the respective second side of the second sheet includes magnifying respective print; and, adjusting a position of print on the respective second side of the first sheet, the respective first side of the second sheet, or the respective second side of the second sheet according to the ratio includes adjusting magnification of the respective print.

22. The apparatus of claim 19, wherein:

said each sheet has a respective length, from the respective first edge to the respective second edge, greater than the distance.

* * * * *